US008134939B2

(12) United States Patent
Ramaswami et al.

(10) Patent No.: US 8,134,939 B2
(45) Date of Patent: *Mar. 13, 2012

(54) MULTICHANNEL RING AND STAR NETWORKS WITH LIMITED CHANNEL CONVERSION

(75) Inventors: Rajiv Ramaswami, Ossining, NY (US); Galen H. Sasaki, Honolulu, HI (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/556,125

(22) Filed: Sep. 9, 2009

(65) Prior Publication Data

US 2010/0054263 A1   Mar. 4, 2010

Related U.S. Application Data

(60) Continuation of application No. 11/131,056, filed on May 16, 2005, now Pat. No. 7,606,180, which is a continuation of application No. 09/362,635, filed on Jul. 21, 1999, now Pat. No. 6,970,433, which is a division of application No. 08/641,061, filed on Apr. 29, 1996, now Pat. No. 6,108,311.

(51) Int. Cl.
*H04J 3/02* (2006.01)
*H04J 14/00* (2006.01)
*H04L 12/42* (2006.01)
*H04L 12/44* (2006.01)
*G06F 15/16* (2006.01)

(52) U.S. Cl. ........ 370/255; 370/258; 370/403; 370/407; 370/424; 370/425; 398/50; 398/56; 398/59; 709/251; 709/252

(58) Field of Classification Search .................. 370/255, 370/258, 403, 407, 424, 425; 398/50, 56, 398/59; 709/251, 252
See application file for complete search history.

(56) References Cited

U.S. PATENT DOCUMENTS

| 4,347,498 A | 8/1982 | Lee et al. |
| 4,516,272 A | 5/1985 | Yano |
| 4,630,254 A | 12/1986 | Tseng |
| 5,003,531 A | 3/1991 | Farinholt et al. |
| 5,018,135 A * | 5/1991 | Ashi et al. ..................... 370/535 |
| 5,043,975 A | 8/1991 | McMahon |
| 5,119,373 A | 6/1992 | Fredricsson et al. |

(Continued)

OTHER PUBLICATIONS

Berge, "Perfect Graphs, "Graphs, North-Holland Mathematical Library, Third revised edition, pp. 372-377.

(Continued)

*Primary Examiner* — Alpus H Hsu
(74) *Attorney, Agent, or Firm* — Hamilton, Brook, Smith & Reynolds, P.C.

(57) ABSTRACT

A ring communication network according to an embodiment of the present invention includes a plurality of nodes in which a single one of the nodes is configured for full channel conversion and the remaining nodes, other than the single node, are configured for no channel conversion. Links with no more than W channels couple the nodes. The ring communication network also may include N nodes and links connecting the nodes for carrying data in W channels such that $N \geq 2 \log_2 W - 1$ where W is a power of 2. Each of the N nodes includes switches connected such that each channel of a first one of the links adjacent to any one of the N nodes can be switched to no more than W−1 channels of another one of the links adjacent any one node.

20 Claims, 9 Drawing Sheets

U.S. PATENT DOCUMENTS

| | | | | |
|---|---|---|---|---|
| 5,130,974 | A | * | 7/1992 | Kawamura et al. ............ 370/217 |
| 5,282,257 | A | | 1/1994 | Ota |
| 5,353,282 | A | | 10/1994 | Dormer et al. |
| 5,404,241 | A | | 4/1995 | Ota |
| 5,418,785 | A | | 5/1995 | Olshansky et al. |
| 5,488,500 | A | * | 1/1996 | Glance ............................ 398/85 |
| 5,506,711 | A | | 4/1996 | Takeyari |
| 5,506,846 | A | | 4/1996 | Edem et al. |
| 5,519,694 | A | | 5/1996 | Brewer et al. |
| 5,535,213 | A | | 7/1996 | Pan et al. |
| 5,548,431 | A | | 8/1996 | Shin et al. |
| 5,550,818 | A | * | 8/1996 | Brackett et al. .......... 370/395.51 |
| 5,553,071 | A | | 9/1996 | Aranguren et al. |
| 5,555,478 | A | * | 9/1996 | Zelikovitz et al. .............. 398/66 |
| 5,606,664 | A | | 2/1997 | Brown et al. |
| 5,675,735 | A | * | 10/1997 | Gallagher et al. ............ 709/228 |
| 5,729,527 | A | | 3/1998 | Gerstel et al. |
| 5,742,585 | A | | 4/1998 | Yamamoto et al. |
| 5,745,269 | A | | 4/1998 | Chawki et al. |
| 5,751,454 | A | | 5/1998 | MacDonald et al. |
| 5,781,537 | A | | 7/1998 | Ramaswami et al. |
| 5,793,746 | A | | 8/1998 | Gerstel et al. |
| 5,809,253 | A | * | 9/1998 | Gallagher et al. ............ 709/228 |
| 5,903,371 | A | | 5/1999 | Arecco et al. |
| 5,923,851 | A | * | 7/1999 | Gallagher et al. ............ 709/228 |
| 6,034,798 | A | * | 3/2000 | Oberg .............................. 398/2 |
| 6,108,311 | A | | 8/2000 | Ramaswami et al. |
| 6,414,767 | B1 | | 7/2002 | Blair et al. |
| 6,970,433 | B1 | | 11/2005 | Ramaswami et al. |
| 7,099,316 | B1 | * | 8/2006 | Tomich et al. ................. 370/389 |

OTHER PUBLICATIONS

Birman, "Computing Approximate Blocking Probabilities for a Class of All-Optical Network," IEEE Journal on Selected Areas in Communications, 14(5): 852-857 (Jun. 1996).

Birman, et al., "Routing and Wavelength Assignment Methods in Single-Hop All Optical Networks with Blocking," IEEE, pp. 431-438 (1995).

Chang, et al., "Multiwavelength Reconfigurable WDM/ATM/SONET Network Testbed," Journal of Lightwave Technology, 14(6):1320-1340 (Jun. 1996).

Chlamtac, et al., "Lightpath Communications: An Approach to High Bandwidth Optical WAN's," IEEE Transactions on Communications, 40(7):1171-1182 (Jul. 1992).

Frank, et al., "Algorithms for routing around a rectangle," Discrete Applied Mathematics 40:363-378 (1992).

Inukai, "An Efficient SS/TDMA Time Slot Assignment Algorithm," IEEE Transactions on Communications, Com-27(10):1449-1455 (Oct. 1979).

Janniello, et al., "Multiplex-protocol optical-fiber multiplexer for remote computer interconnection," OFC 95 Technical Digest, pp. 163-164 (1995).

Kovacevic, et al., "Benefits of Wavelength Translation in All-Optical Clear-Channel Networks," IEEE Journal on Selected Areas in Communications, 14(5):868-880 (Jun. 1996).

Lee, et al., "A Wavelength-Convertible Optical Network," Journal of Lightwave Technology, 11(5/6): 962-970 (May/Jun. 1993).

Lee, et al., "Routing and Switching in a Wavelength Convertible Optical Network," IEEE, pp. 578-585 (1993).

Mihail, et al., "Efficient Access to Optical Bandwidth," IEEE Symp. on Foundations of Computer Science, pp. 548-557 (1995).

Raghavan, et al., "Efficient Routing in All-Optical Networks," Proceedings of the 26th Symp Theory of Computing, pp. 134-143 (May 1994).

Ramaswami, et al., "Routing and Wavelength Assignment in All-Optical Networks," IEEE/ACM Transactions on Networking, 3(5): 489-500 (Oct. 1995).

Subramaniam, et al., "Connectivity and Sparse Wavelength Conversion in Wavelength-Routing Networks," IEEE, pp. 148-155 (1996).

Toba, et al., "An Optical FDM-Based Self-Healing Ring Network Employing Arrayed Waveguide Grating Filters and EDFA's with Level Equalizer," IEEE Journal on Selected Areas in Communications, 14(5): 800-813 (Jun. 1996).

Tucker, "Coloring a Family of Circular Arcs," SIAM J. Appl. Math., 29(3):493-502 (Nov. 1975).

Wauters, et al.,"Design of the Optical Path Layer in Multiwavelength Cross-Connected Networks," IEEE Journal on Selected Areas in Communications, 14(5):881-892 (Jun. 1996).

Yates, et al., "Limited-Range Wavelength Translation in All-Optical Networks," IEEE, pp. 954-961 (1996).

Zhou, et al., "Four-Wave Mixing Wavelength Conversion Efficiency in Semiconductor Traveling-Wave Amplifiers Measured to 65 nm of Wavelength Shift," IEEE Photonics Technology Letters, 6(8):984-987 (Aug. 1994).

* cited by examiner (A) A STAR NETWORK WITH 4 SPOKE NODES (B) DIRECTING THE SET OF ROUTES IN THE NETWORK (C) THE BIPARTITE GRAPH G

MULTICHANNEL RING AND STAR NETWORKS WITH LIMITED CHANNEL CONVERSION

RELATED APPLICATIONS

This application is a continuation of U.S. application Ser. No. 11/131,056, filed May 16, 2005 now U.S. Pat. No. 7,606,180, which is a continuation of International application Ser. No. 09/362,635, filed Jul. 21, 1999 (issued as U.S. Pat. No. 6,970,433 on Nov. 29, 2005), which is a divisional of U.S. application Ser. No. 08/641,061, filed Apr. 29, 1996 (issued as U.S. Pat. No. 6,108,311 on Aug. 22, 2000). The entire teachings of the above applications are incorporated herein by reference.

GOVERNMENT SUPPORT

The invention was supported, in whole or in part, by a grant MDA972-95-C-0001 from Advanced Research Projects Agency (ARPA). The Government has certain rights in the invention.

BACKGROUND OF THE INVENTION

A multichannel link comprises a number of channels, say W, between two sites. These channels may be transmitted separately (for example over parallel wires or fiber cables) or multiplexed on to one of a small number of wires or fibers using time or channel division multiplexing. Usually these links are realized in the form of line cards, one for each channel at each end of the link. A line card is a device that provides an interface between the I/O for the channel and the transmission medium. The set of line cards associated with each end of a link along with any associated multiplexing/demultiplexing unit is called a multiplexor.

One example is the IBM optical multiplexer system [1]. This system multiplexes up to ten full-duplex channels on to a single transmission link.

Multiplexors can be connected in a ring or star network configuration across multiple sites (herein called nodes). Nodes may be configured to allow pairs of channels to be connected to one another. This may be accomplished by some kind of switching at the node. For example, consider a network realized by line cards. In addition, consider two channels from different links, but where the links are incident to a common node. Each of these channels has a line card at the node. Suppose the line cards are connected. Then the channels may be connected to each other since the signal from one channel may be transferred to the other channel by going through the line cards and the connection between the line cards. If a pair of channels may be connected to one another, as for example, through a switching network, then we refer to them as being attached.

A node is said to be configured if pairs of its incident channels are attached. The network is said to be configured if each of its nodes is configured. For a network configuration, a node is said to have channel degree k if for each pair of its incident links, the channels of the links have the following property: each channel in one link is attached to k channels of the other link. A node has full channel conversion if its channel degree is W. A node is said to have fixed channel conversion if its channel degree is one. Suppose at each link in the network, the channels are numbered $\{0, 1, \ldots, W-1\}$. Then a node is said to have no channel conversion if its channel degree is such that channels with the same number are attached.

A network is configured so that end-to-end communication connections between pairs of nodes may be established in the network. An end-to-end communication connection is specified by a path in the network, and it is realized by a set of channels, one from each link along the path so that channels that are incident to a common node are attached through the node. This realization allows a signal that is sent from one end of the path to be received at the other end by being transported along the attached channels. The path corresponding to an end-to-end communication connection will be referred to as a route, and a set of channels that realizes the end-to-end communication connection will be referred to as a channel assignment for the route.

Note that it is straightforward to realize a set of end-to-end communication connections in a network configured so that each node has full channel conversion. It is more cost effective to have nodes configured so that some or all nodes have channel degree less than W, i.e., allow only limited switching capability at the nodes. However, in general, networks configured to have less than full channel conversion at each node may require more channels to realize the same end-to-end communication connections than if they were configured to have full channel conversion at each node.

A request is a set of routes and corresponds to a set of end-to-end communication connections. The load of a request is the value $\max_{e \in E} \lambda_e$, where $\lambda_e$ denotes the number of routes using link e and E denotes the set of links in the network. For a network configuration, a channel assignment for a request is a collection of assignments for routes, one per route of the request, such that each channel is assigned to at most one route of the request, i.e., no two routes will share a channel. Note that a channel assignment for a request realizes all of the end-to-end communication connections corresponding to the request.

Prior art focuses on networks with either no channel conversion or networks with full channel conversion. For the case where all nodes have full channel conversion, (i.e., k=W), a sufficient (and necessary) condition for feasibility is $W \geq \lambda_{max}$, where $\lambda_{max}$ is the load for the request. For the case when all nodes have no channel conversion (hence at each node, k=1), [2] gives a method that performs a channel assignment using $W \geq 2\lambda_{max}$ on a ring network and $$W \geq \frac{3}{2}\lambda_{max}$$

for a star network.

Prior art also proposes several heuristic channel assignment schemes for networks without channel conversion that may not be efficient in terms of using a small number of channels to perform the channel assignment. For example, see [3, 4, 5, 6, 7, 8]. For the case of limited channel conversion, [9, 10] propose some network configurations and some heuristic channel assignment schemes for these configurations that again may not be efficient in terms of using a small number of channels to perform the channel assignment. Prior art does not propose configuration methods and efficient channel assignment techniques for networks with limited channel conversion.

SUMMARY OF THE INVENTION

The invention proposes configurations of ring and star networks with limited channel conversion to efficiently support connections. In addition, algorithms are provided to efficiently assign channels to connections.

More specifically, it is an object of this invention to provide a cost effective network by using nodes with limited switching capability.

It is also an object of this invention to efficiently assign channels to links of a network with nodes having limited switching capabilities so as to maximize network resources. More generally, it is the overall object of this invention to configure a network and assign channels to the network in a cost effective manner.

The invention achieves the following results:

In a ring network with N nodes, the invention proposes a network configuration and for this configuration, proposes a channel assignment method for any request with load $\lambda_{max}$ that uses $\lambda_{max}$ channels with channel degree at most k=2 at each node provided $N \geq 2 \log_2 \lambda_{max} - 1$ and W is a power of two.

$\lambda_{max}$ channels with channel degree at most $\Delta+1$ at each node, where $\Delta>1$, provided $N \geq \log_\Delta \lambda_{max}$.

In a star network, the invention proposes a configuration and for this configuration, proposes a channel assignment method for any request with load $\lambda_{max}$ that uses $\lambda_{max}$ channels with fixed conversion.

In a network with an arbitrary topology the invention proposes a configuration and for this configuration, proposes a channel assignment method for any request with load $\lambda_{max}$ where no connection is more than 2 hops, that uses $\lambda_{max}$ channels with fixed conversion.

Accordingly, this invention provides for a method of configuring nodes in a ring communications network wherein one of the nodes of ring is designated as a primary node, which is configured to have full channel conversion. That is, any two channels between its two incident links can be connected to each other. The other nodes of the network are configured to have no channel conversion. That is, any channel c on one of the incident links of a node is connected to the same channel c on the other incident link of the node. This invention also provides a method of assigning channels in a ring communications network which is configured as described in the previous paragraph. With the assignment scheme of the invention the paths used for end-to-end communication connections are divided into cut paths and uncut paths, where a cut path is a path that passes through the primary node, while an uncut path does not pass through the primary node. Each cut path $p_i$ is divided into two paths $a_i$ and $b_i$ by splitting path $p_i$ at the primary node, where the primary node becomes an end node for paths $a_i$ and $b_i$. The paths $a_i$ and $b_i$ are referred to as residual paths. Then, each link along each uncut path is assigned a single channel, and each link along a residual path is assigned the same channel. Thus, a cut path can use two different channels corresponding to its two residual paths.

This invention also comprises a network which is configured as above.

This invention also provides a method of configuring nodes of a ring communications network having multichannel multiplexed links. With this method, the N nodes of the ring are numbered consecutively starting at the primary node and proceeding in one direction around the ring. Also, the link between nodes i and (i+1) mod N is given the number i. Then, each of the nodes is configured such that channel c on link i may be connected to one of $\Delta+1$ channels on link (i+1) mod N, where $\Delta$ is greater than or equal to 2 and where one of the channels on link (i+1) mod N is channel (C+1) mod W, where the other A channels on link (i+1) mod N are channels $(C - k \cdot \Delta^i)$ mod W for k=0, 1, .., $\Delta-1$ and where W is the number of channels in each link. This invention also describes a method of assigning the channels in a ring communications network configured as described in the previous paragraph, and the details of this assignment scheme is described in the specification.

This invention also describes a method of configuring the nodes in an arbitrary network having N nodes and E links, where each link is a multichannel multiplexed link having W channels, and where W is an even integer. With this aspect of the invention, the channels are numbered from 0 to W−1, and at each node, for channels i=0, 1, . . . , W/2−1, channel i on one link is connected to channel w(i) on all other links incident to A final aspect of the invention is a method of assigning channels to the arbitrary that node, where w(i)=i+W/2.

A final aspect of the invention is a method of assigning channels to the arbitrary network configured as in the previous paragraph. This assignment scheme is described in the specification.

Figure 1:
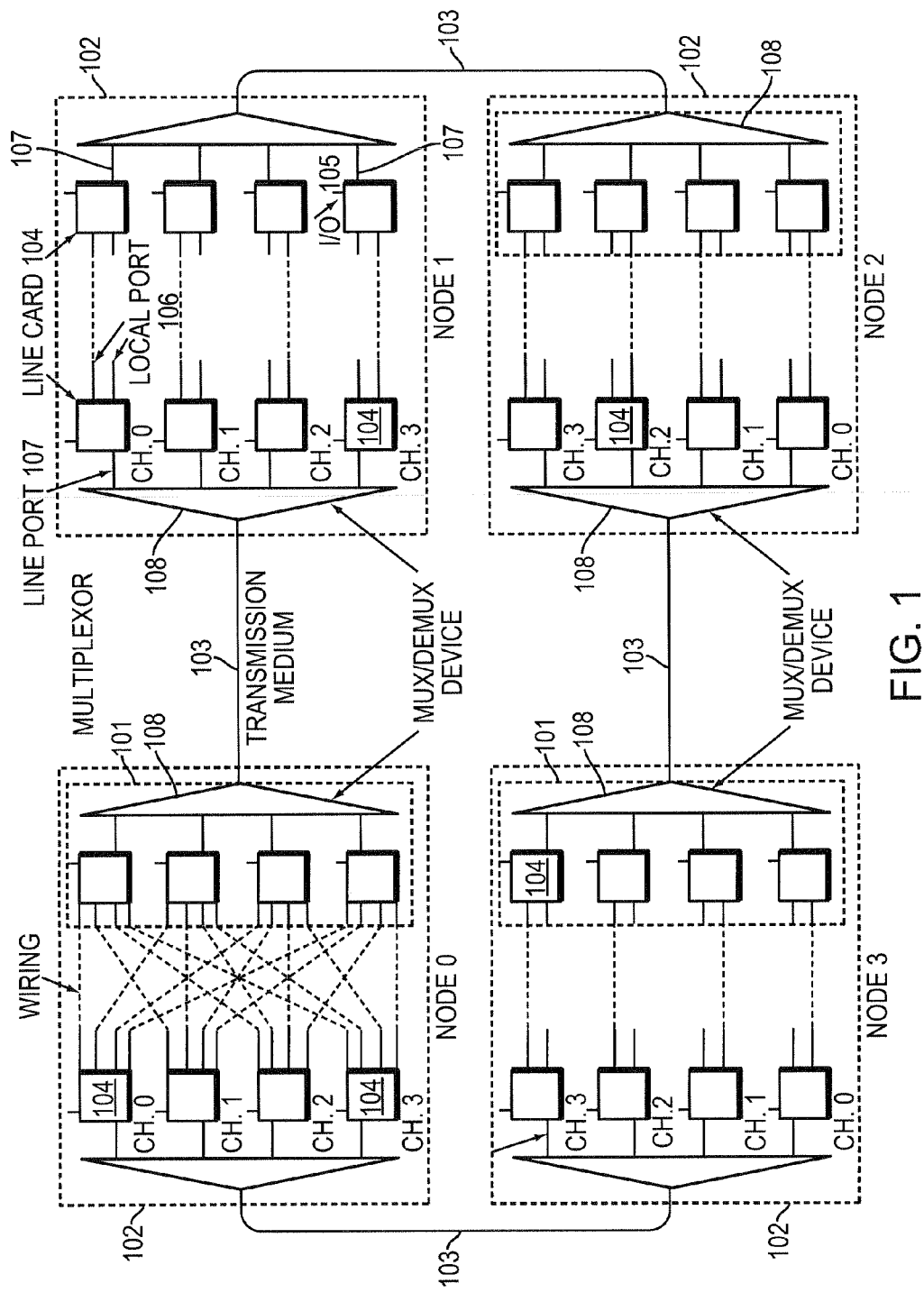
FIG. 1 shows a configuration of multiplexors in a ring network for the case of full conversion at one node and no conversion at the other nodes.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE PREFERRED EMBODIMENT

Ring Network

FIG. 1 shows the block diagram of multiplexors 101 connected in a ring network configuration. Each node 102 in the network consists of a pair of multiplexors. Two nodes are connected by a transmission link or medium 103. The figure shows 4 channels on each link. For each channel there is a line card 104 within each multiplexor 101. A line card consists of an I/O port 105, multiple local ports 106 and a line port 107 and a switch (not shown in the figure) that allows any pairs of these ports to be connected together. For the case of the ring network, the number of local ports per line card is at least the channel degree defined earlier. In FIG. 1 node 0 has channel degree 4 while other nodes have channel degree 1. Node 0 is called the primary node. The line ports of all the line cards within a multiplexor are connected to a mux/demux unit 108 which combines all the channels on to the transmission link. Within each node the line cards from one multiplexor are hard wired to the line cards in the other multiplexor according to a specific wiring pattern 109 given later. This wiring pattern determines which channels are attached to each other within the node. In node 0 for example, each channel is attached to all the channels. In the other nodes each channel is attached only to other channels with the same channel number.

In the subsequent discussion, we will provide feasibility results for the following network configurations: (i) one node has full channel conversion and the other nodes have no channel conversion, (ii) all nodes have channel degree at most two, (iii) all nodes have channel degree at most $\Delta+1$, where $\Delta$ is an integer greater than one. In the discussion, we will assume, without loss of generality, the following:

each link has its channels numbered $\{0, 1, \ldots, W-1\}$, where W is the number of channels per link;

nodes are numbered $0, 1, \ldots, N-1$ around the ring, where N denotes the number of nodes; and for each $i=0, 1, \ldots, N-1$, the link between node i and node $(i+1) \mod N$ is numbered i.

Configuration with Full Channel Conversion at One Node and No Channel Conversion at Other Nodes The ring network is configured so that one of its nodes has full channel conversion. This node is referred to as the primary node, and without loss of generality, let it be node 0. The other nodes have no channel conversion.

Suppose we are given a request $\{p_1, \ldots, p_m\}$, where m is the number of routes in the request. Then the following is a channel assignment for the request. First, refer to routes that pass through node 0 as cut routes and the rest of the routes as uncut. A set P of paths is generated as follows. Include each uncut route in P. For each cut route $p_i$, cut (or split) it at node 0 into a pair of paths $\{a_i, b_i\}$ called residual paths such that each residual path includes node 0. Without loss of generality, let $a_i$ correspond to the residual path that traverses link N-1, and let $b_i$ correspond to the residual path that traverses link 0. Refer to $a_i$ as the left residual path, and $b_i$ as the right residual path. (For example, if N=5 and $p_i$ is a path with the sequence of nodes 4-5-0-1-2 then the residual path $a_i$ corresponds to 4-5-0 and $b_i$ corresponds to 0-1-2). Include the residual paths in P.

Next, partition the paths in P into W subsets $(P_0, P_1, \ldots, P_{w-1})$ such that paths in the same subset do not traverse common links of the ring network. We will refer to the partition $(P_0, P_1, \ldots, P_{w-1})$ as a cut-and-color partition for the request. One way to find a cut-and-color partition is to assign channel numbers $\{0, \ldots, W-1\}$ to the paths in P such that paths with a common link have distinct numbers. This is like coloring paths in an interval graph [11, Sec. 16.5] because no path of P crosses through node 0. Hence, we can use a greedy algorithm assignment that requires $\lambda_{max}$ numbers [11, Sec. 16.5]). [11] is hereby incorporated by reference. Then for $i=0, 1, \ldots, W-1$, all paths that have been assigned to channel number i are in subset $P_i$.

We will now describe the channel assignment for the request. For each uncut route $p_i$, channel number j is assigned to it where j satisfies $p_i \in P_j$. For each link traversed by $p_i$, the channel numbered j of that link is assigned to $p_i$. For each cut route $p_i$, two channel numbers $j_a$ and $j_b$ are assigned to it, where the channel numbers correspond to the left residual path $a_i$, and right residual path $b_i$ of $p_i$. In particular, $j_a$ satisfies $a_i \in P_{ja1}$, and $j_b$ satisfies $b_i \in P_{jb}$. For each link traversed by $p_i$, a channel is assigned to $p_i$ as follows. If the link is traversed by $a_i$ then the channel numbered $j_a$ is assigned to $p_i$. Otherwise, the link must be traversed by $b_i$, and the channel numbered $j_b$ is assigned to $p_i$.

The desired channel assignment can be realized by setting the switches in the configured network appropriately, as shown in the example below.

Example: Consider the 4-node network of FIG. 1 redrawn in FIG. 2 with W=4 channels and let the request be $p_0$=0-1-2
$p_1$=1-2-3
$p_2$=2-3-0-1
$p_3$=2-3-0
$p_4$=3-0-1-2 and $p_5$=1-2-3 be as shown in the figure. Node 0 is the primary node. Then a cut-and-color partition for the request is the routes with $P_0=\{p_0, a_2\}$
$P_1=\{b_2, p_1, a_4\}$
$P_2=\{b_4, p_3\}$ and $P_3=\{p_5\}$ where $a_2$=2-3-0, $b_2$=0-1 and $a_4$=3-0, $b_4$=0-1-2. Here $a_i$ and $b_i$ correspond to the cut routes of $p_i$. Thus the individual routes would be assigned channels as shown below and in FIG. 2.

|       | Links |   |   |   |
|-------|---|---|---|---|
| Route | 0 | 1 | 2 | 3 |
| $p_0$ | 0 | 0 | — | — |
| $p_1$ | — | 1 | 1 | — |
| $p_2$ | 1 | — | 0 | 0 |
| $p_3$ | — | — | 2 | 2 |
| $p_4$ | 2 | 2 | — | 1 |
| $p_5$ | — | 3 | 3 | — |

Configuration for Channel Degree 2

Suppose W is a power of two and $N \geq 2 \log_2 W - 1$. There is a configuration with channel degree two at each node with the following property. All requests that have load at most W are feasible.

The configuration attaches pairs of channels to form a permutation network. To be more specific, channels are attached according to a new graph H, which has the following properties:

The set of vertices of H may be organized into s+1 stages, numbered $0, 1, \ldots, s$, where $s \leq N+1$, such that there are W vertices $\{u_0, \ldots, u_{w-1}\}$ at stage 0 and there are W vertices $\{v_0, \ldots, v_{w-1}\}$ at stage s. For the sake of discussion, label the vertices at stage 0 $\{u_0, \ldots, u_{q-1}\}$ and the vertices at stage s $\{v_0, \ldots, v_{q-1}\}$. We will also refer to those stages $i=1, 2, \ldots, s-1$ (i.e., those that are not stage 0 or stage s) as the intermediate stages.

The set of edges of H are between consecutive stages of vertices such that there are exactly W edges between stages. To be more specific, for $i=0, 1, \ldots, s-1$, there are W edges between stage i and stage i+1.

Each vertex in the stage 0 has exactly one incident edge.
Each vertex in stage s has exactly one incident edge.
The graph H has the following additional property. Let any function $f(\cdot)$ on $\{0, \ldots, W-1\}$ be called a permutation if $(f(0), \ldots, f(W-1))$ are distinct values of $\{0, \ldots, W-1\}$. For example, if $f(\cdot)$ is a function on $\{0, 1, 2, 3\}$ and $(f(0), f(1), f(2), f(3))=(1, 3, 0, 2)$ then it would be a permutation on $\{0, 1, 2, 3\}$. Now H has the property that for any permutation $\pi(\cdot)$ on $\{0, \ldots, W-1\}$, there is a collection $(\tau(\cdot), h_0, h_1, \ldots, h_{w-1})$, where $\tau(\cdot)$ is a permutation on $\{0, \ldots, W-1\}$;

$\{h_0, h_1, \ldots, h_{w-1}\}$ is a collection of W paths in H;

for each $i=0, 1, \ldots, W-1$, path $h_i$ starts at vertex $u_{\tau(\pi(i))}$ in stage 0, traverses stages $1, 2, \ldots, s-1$ in succession, and ends at vertex $u_{\tau(\pi(i))}$ in stage s; and the paths $\{h_0, \ldots, h_{w-1}\}$ do not have common edges in H, i.e., they are edge disjoint in H.

We will refer to the collection $(\tau(\cdot), h_0, \ldots, h_{w-1})$ as an interconnection instance for $\pi(\cdot)$.

The edges of H are assigned to the channels of the ring network as follows. The W edges of H between the vertices in stages 0 and 1 are assigned to the channels of link 0 such that for $i=0, 1, \ldots, W-1$, the edge incident to $u_i$ of stage 0 is assigned to the channel numbered i. The W edges of H between vertices in stages $s-1$ and s are assigned to the channels of link $(s-1)$ mod N such that for $i=0, 1, W-1$, the edge incident to $v_i$ of stage s is assigned to the channel numbered i. For $i=1, \ldots, s-2$, the W edges of H between the vertices in stages i and $(i+1)$ mod N are assigned to the W channels of link i mod N in the ring network. (Note that it is possible for two different stages of edges of H to be assigned to the channels of the same link, e.g., if $s=N+1$ then the edges between stages 0 and 1 and the edges between stages $s-1$ and s will both be assigned to the channels in link 0.) We will use the notation that if e is an edge in H then $\gamma(e)$ is the channel it is assigned to.

The ring network is configured as follows. For $i=1, 2, \ldots, s-1$, channels are attached through node i mod N of the ring network as follows: if e and é are edges of H such that e is between the stages $i-1$ and i of vertices, é is between stages i and $i+1$ of vertices, and e and é are incident to a common vertex in stage i then the channels $\gamma(e)$ and $\gamma(\acute{e})$ are attached through node i. All other nodes of the ring network are configured so that there is no channel conversion.

Figure 3:
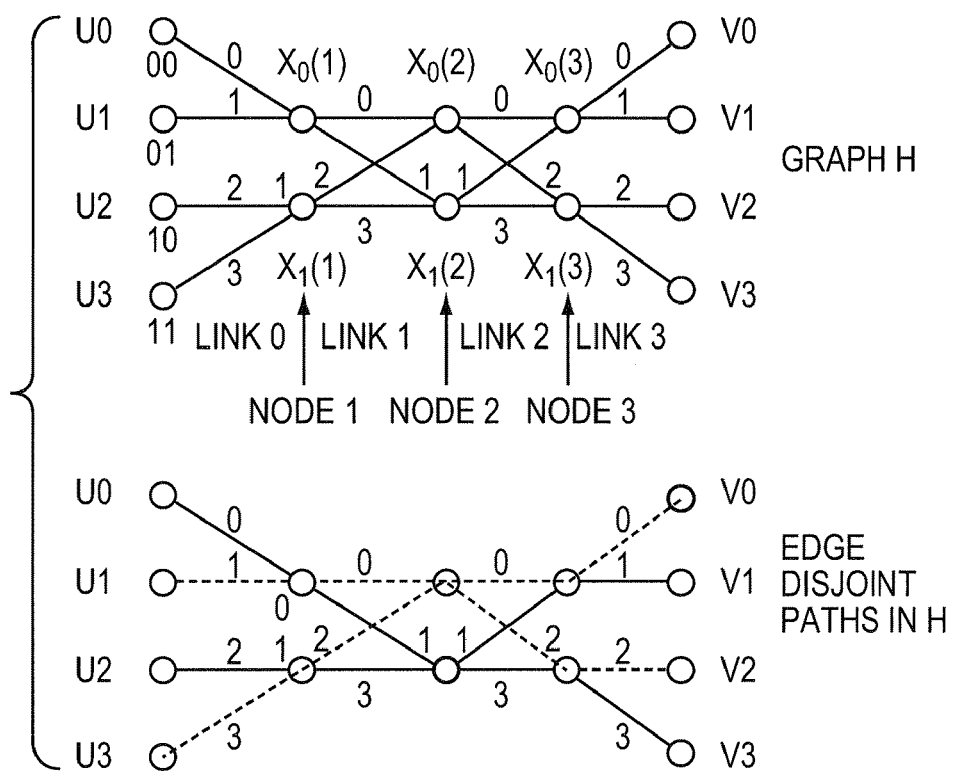
FIG. 3 shows the graph H, representing a Benes permutation network for the case of 4 wavelengths (W=4) along with a set of edge-disjoint paths in H.

A particular topology for H that leads to a network configuration of channel degree two at every node is the Benes interconnection network topology [12]. The Benes topology has $s=2 \log_2 W$, so that it has $2 \log_2 W+1$ stages of vertices, where the stage 0 vertices $\{u_0, \ldots, u_{w-1}\}$ are the inputs of the Benes topology and stage s vertices $\{v_0, \ldots, v_{w-1}\}$ are the outputs. FIG. 3 shows the graph H for the case W=4. Here, there are 5 stages of vertices, where the stage 0 vertices are $\{u_0, u_1, u_2, u_3\}$, the stage 1 vertices are $\{\chi_0(1), \chi_1(1)\}$, the stage 2 vertices are $\{\chi_0(2), \chi_1(2)\}$, the stage 3 vertices are $\{\chi_0(3), \chi_1(3)\}$, and the stage 4 vertices are $\{v_0, v_1, v_2, v_3\}$. Also note that there are exactly W=4 edges between consecutive stages of vertices.

Notice that in a Benes topology H, vertices in an intermediate stage i have exactly two incident edges to vertices in stage $i+1$, and exactly two incident edges to vertices in stage $i-1$. This implies that in the resulting configured ring network, each node has channel degree at most two.

Figure 4:
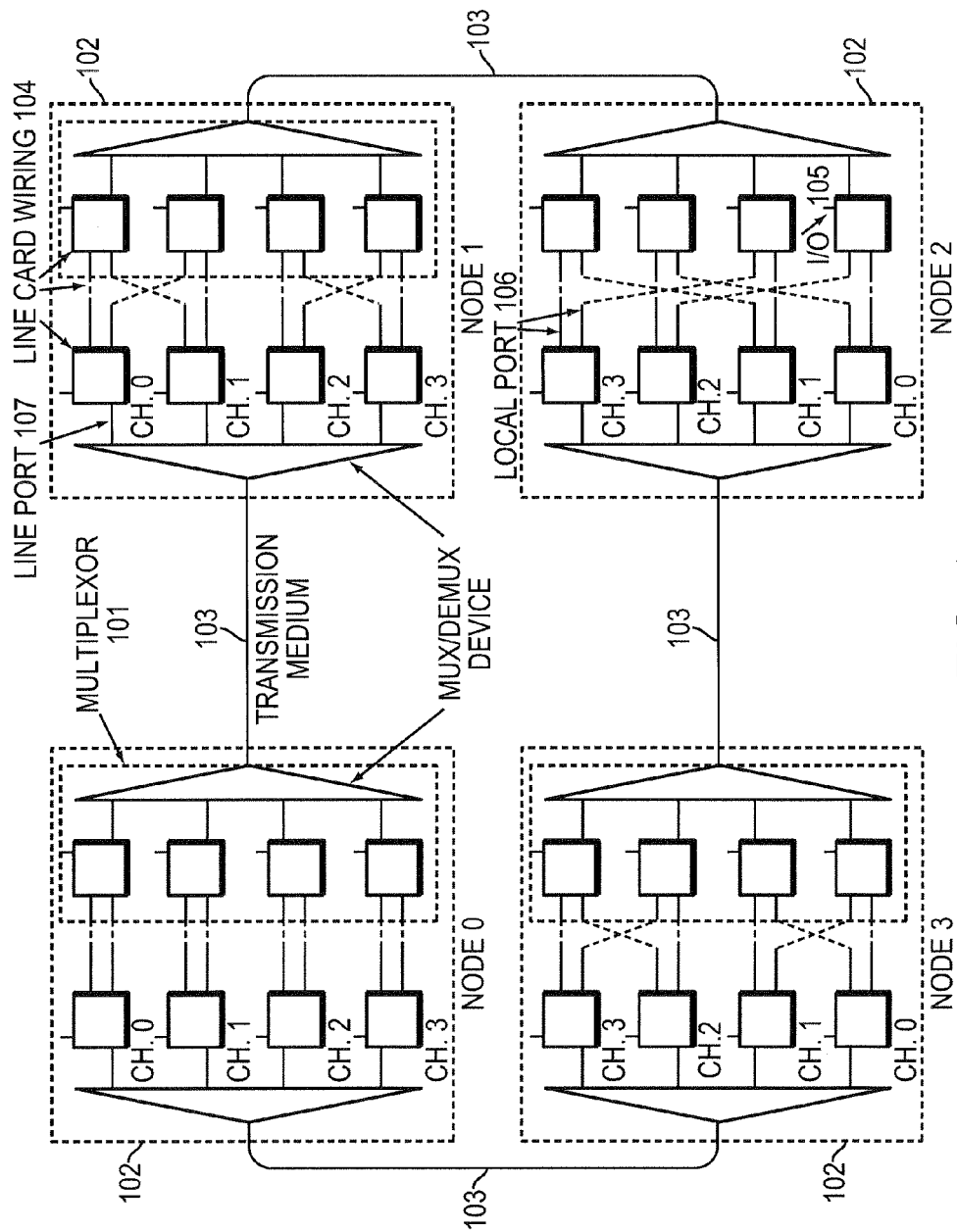
FIG. 4 shows a configuration of multiplexors in a ring network corresponding to a Benes network configuration.

The Benes topology has the property that for any permutation $\pi(\cdot)$ on $\{0, \ldots, W-1\}$, there is an interconnection instance $(\tau(\cdot), h_0, \ldots, h_{w-1})$ such that $\tau(\cdot)$ satisfies $(\tau(0), \tau(1), \ldots, \tau(W-1))=(0, 1, \ldots, W-1)$, i.e., $\tau(\cdot)$ is the identity function. Thus, for $i=0, \ldots, W-1$, the path $h_i$ starts at vertex $u_i$ and ends at vertex $v_{\pi(i)}$. The Benes topology is referred to as a permutation network since it has this property. FIG. 3 shows an example $\{h_0, h_1, h_2, h_3\}$ for the permutation $\pi(\cdot)$ that satisfies $(\pi(0), \pi(1), \pi(2), \pi(3))=(1, 2, 3, 0)$ for the case when W=4. Here, $h_0=u_0-\chi_0(1)-\chi_1(2)-\chi_0(3)-v_1$ $h_1=u_1-\chi_0(1)-\chi_0(2)-\chi_1(3)-v_2$ $h_2=u_2-\chi_1(1)-\chi_1(2)-\chi_1(3)-v_3$, and $h_3=u_3-\chi_1(1)-\chi_0(2)-\chi_1(3)-v_2$ As an example of a network configuration consider a 4-node ring network with W=4 channels per link. Let H be the Benes network graph in FIG. 3. The edges of H between the stage 0 and stage 1 vertices are assigned to the channels of link 0. Similarly, the edges between stages 1 and 2 are assigned to the channels of link 1, the edges between stages 2 and 3 are assigned to the channels of link 2, and the edges between stages 3 and 4 are assigned to the channels of link 3. In the figure, the channel numbers for each edge are given. For example, edge $\chi_0(1)-\chi_1(2)$ is assigned to a channel numbered 1 (in link 1), i.e., $\gamma(\chi_0(1)-\chi_1(2))$ is the channel numbered 1 in link 1. Notice that vertices $u_0, u_1, u_2$, and $u_3$ are assigned to channels numbered 0, 1, 2, and 3, respectively. Also, vertices $v_0, v_1, v_2$, and $v_3$ are assigned to channels numbered 0, 1, 2, and 3, respectively. Now, if a pair of edges of H are incident to a common vertex in stage i ($i=1, \ldots, s-1$) and one edge is between stages $i-1$ and i and the other is between stages i and $i+1$ then their assigned channels are attached through node i. For example, edges $\chi_0(1)-\chi_1(2)$ and $\chi_1(2)-\chi_1(3)$ of H are incident to a common vertex $\chi_1(2)$. Then their associated channels in the ring network (channel 1 of link 1 and channel 3 of link 2) are attached through node 2. Note that node 0 has no channel conversion. The corresponding wiring arrangement for the ring network configuration is shown in FIG. 4. Nodes 1, 2 and 3 realize a Benes network graph and node 0 is wired so that there is no channel conversion.

Once the ring network has been configured (with respect to some H), then a channel assignment can be found for any request that satisfies $\lambda_{max} \leq W$. We will now describe a channel assignment for such a request $\{p_1, \ldots, p_m\}$, where m is the number of routes in the request.

First, a cut-and-color partition $(P_0, \ldots, P_{w-1})$ is found for the request. Next, a permutation $\pi(\cdot)$ on $\{0, 1, \ldots, W-1\}$ is found with the following property: for each cut route $p_i$ of the request, consider its left residual path $a_i$ and right residual path $b_i$, and if the $a_i$ is in $P_j$ and $b_i$ is in $P_k$ then $\pi(j)=k$. We will refer to such a permutation as a permutation for the cut-and-color partition. (Note that there may be more than one permutation for a partition if the number of cut paths is less than W.)

One method to determine a permutation $\pi(\cdot)$ of the cut-and-color partition is as follows. Let $\Gamma$ denote a set that equals $\{0, \ldots, W-1\}$. Now for each cut route $p_i$ of the request do the following: (1) determine the left residual path $a_i$ and right residual path $b_i$ of $p_i$; (2) determine $j_a$ and $j_b$ such that $a_i \in P_{ja}$ and $b_i \in P_{jbi}$; and then let $\pi(j_a)=j_b$ and remove the value $j_b$ from the set $\Gamma$. For each $i=0, \ldots, W-1$, such that the value of $\pi(i)$ has yet to be determined, pick a value j from $\Gamma$, and then let $\pi(i)=j$ and remove j from $\Gamma\Gamma$. For example, suppose W=4 and the only cut routes of the request are $p_1$ and $p_2$. Suppose the cut-and-color partition $(P_0, \ldots, P_3)$ is such that $a_1 \in P_2, b_1 \in P_3$, $a_2 \in P_3$, and $b_2 \in P_0$. Then $\pi(2)=3$ and $\pi(3)=0$. This leaves the values of $\pi(0)$ and $\pi(1)$ yet to be determined. Their values should not be from the set $\{0, 3\}$, which have already been used. Thus, we can let $\pi(0)=2$ and $\pi(1)=1$ which will leave $\pi(\cdot)$ a permutation.

Now for each i=0, . . . , W−1, a collection of channels of the ring network is assigned to $P_i$, one channel per link of the ring network. This is done as follows. For the graph H and permutation π(•) (of the cut-and-color partition), find the interconnection instance (τ(•), $h_0, h_1, \ldots, h_{w-1}$). For each i=0, . . . , W−1, let $$\{e_i(0), e_i(1), \ldots, e_i(j), \ldots, e_i(s-2)\}$$

denote the edges of H traversed by path $h_{\tau(i)}$, where $e_i(j)$ is the one between stages j and j+1. Let $$\{g_i(0), g_i(1), \ldots, g_i(j), \ldots, g_i(s-2)\}$$

be the collection of channels of the ring network, where $g_i(j)$ is the channel assigned to edge $e_i(j)$, i.e., $g_i(j)=\gamma(e_i(j))$. In addition, if s≦N then let $$\{g_i(s-1), g_i(s+1), \ldots, g_i(j), \ldots, g_i(N-1)\}$$

be the collection of channels of the ring network, where $g_i(j)$ is the channel numbered τ(π(i)) of link j. The collection $$\{g_i(0), g_i(1), \ldots, g_i(N-1)\}$$

are the channels assigned to $P_i$.

The channel assignment for the request can now be determined. For each uncut route $p_i$, assign channels to it as follows. Find k such that $p_i \epsilon P_k$. For each link j of the ring network traversed by $p_i$, assign channel $g_i(j)$ to route $p_i$.

For each cut route $p_i$, assign channels to it as follows. Let $a_i$ and $b_i$ be the residual paths of $p_i$. Find $k_a$ and $k_b$ such that $a_i \epsilon P_{ka}$ and $b_i \epsilon P_{kb}$. For each link j traversed by $a_i$, assign channel $g_{ka}(j)$ to route $p_i$. For each link j traversed by $b_i$, assign channel $g_{kb}(j)$ to route $p_i$.

Example: As an example consider a 4-node ring network with W=4 channels per link and configured according to the H in FIG. 3. The corresponding wiring arrangement for the ring network configuration is shown in FIG. 4. Nodes 1, 2 and 3 realize a Benes interconnection network and node 0 is wired so that there is no conversion.

Figure 2:
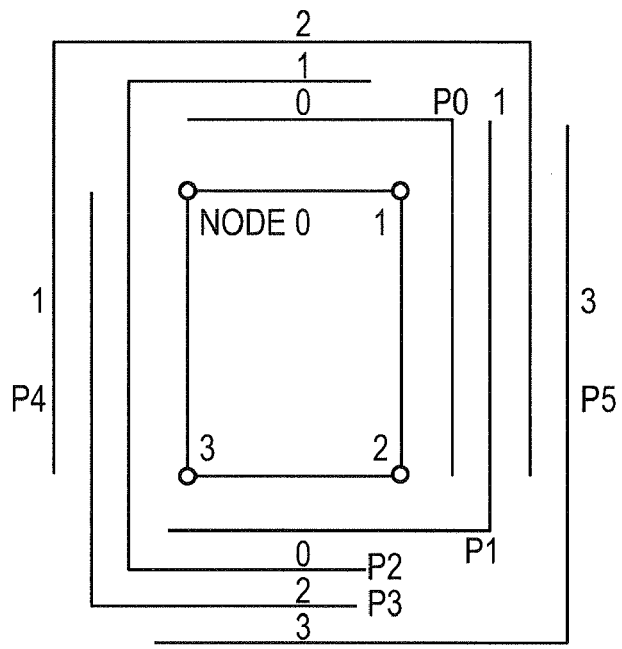
FIG. 2 shows a simplified diagram of a 4-node ring network and a sample request.

Consider the same request as in FIG. 2. The cut-and-color partition is the same as before. A permutation π(•) for the partition is (π(0), π(1), π(2), π(3))=(1, 2, 3, 0).

(Notice, since there are only two cut routes in the request $\{p_0, \ldots, p_5\}$, that there are other permutations for the partition, e.g., $(\pi^1(0), \pi^1(1), \pi_1(2), \pi^1(3))$=(1, 2, 0, 3).)

An interconnection instance (τ(•), $h_0, h_1, h_2, h_3$) for π(•) is where π(•) is the identity function (i.e., (τ(0), τ(1), τ(2), τ(3))=(0, 1, 2, 3)) and $h_0=u_0-\chi_0(1)-\chi_1(2)-\chi_0(3)-v_1$, $h_1=u_1-\chi_0(1)-\chi_0(2)-\chi_1(3)-v_2$, $h_2=u_2-\chi_1(1)-\chi_1(2)-\chi_1(3)-v_3$, and $h_3=u_3-\chi_1(1)-\chi_0(2)-\chi_0(3)-v_0$, as shown in FIG. 3. Equivalently, the paths traverse the following edges of H:

$h_0: u_0-\chi_0(1), \chi_0(1)-\chi_1(2), \chi_1(2)-\chi_0(3), \chi_0(3)-v_1$, $h_1: u_1-\chi_0(1), \chi_0(1)-\chi_0(2), \chi_0(2)-\chi_1(3), \chi_1(3)-v_2$, $h_2: u_2-\chi_1(1), \chi_1(1)-\chi_1(2), \chi_1(2)-\chi_1(3), \chi_1(3)-v_3$, $h_3: u_3-\chi_1(1), \chi_1(1)-\chi_0(2), \chi_0(2)-\chi_0(3), \chi_0(3)-v_0$.

Using the assignment of edges to channels, as shown in FIG. 3, we can get an assignment of channels to each $P_i$, (i=0, 1, 2, 3). For example, for $P_0$, we consider the edges traversed by $h_0$. The edge $u_0-\chi_0(1)$ is assigned to channel 0 in link 0, the edge $\chi_0(1)-\chi_1(2)$ is assigned to channel 1 in link 1, the edge $\chi_1(2)-\chi_0(3)$ is assigned to channel 1 in link 2, and the edge $\chi_0(3)-v_1$ is assigned to channel 1 in link 3. The following are the channel assignments to each $P_i$ (i=0, 1, 2, 3).

| Set | Channels | | | |
|---|---|---|---|---|
| | Link 0 | Link 1 | Link 2 | Link 3 |
| $P_0$ | 0 | 1 | 1 | 1 |
| $P_1$ | 1 | 0 | 2 | 2 |
| $P_2$ | 2 | 3 | 3 | 3 |
| $P_3$ | 3 | 2 | 0 | 0 |

Based on this, the individual routes are assigned channels. For example, consider an uncut route $p_3$=2-3-0. Notice that $p_3 \epsilon P_2$, and so $p_3$ uses channels assigned to $P_2$. Since $p_3$ traverses links 2 and 3, its channels are (according to the table above) channel 3 in link 2 and channel 3 in link 3. As another example, consider the cut route $p_2$=2-3-0-1. Notice that $p_2$ has the residual paths $a_2$=2-3-0 and $b_2$=0-1. Notice that $a_2 \epsilon P_0$, and so $p_2$ uses some of the channels assigned to $P_0$. In particular, since $a_2$ traverses links 2 and 3, the channels are (according to the table above) channel 1 in link 2 and channel 1 in link 3. Notice that $b_2 \epsilon P_1$, and so $p_2$ uses a channel assigned to $P_1$. In particular, since $b_2$ traverses link 0, the channel is (according to the table above) channel 1 in link 0.

The channel assignment for the request $\{p_0, \ldots, p_5\}$ is shown in the table below.

| Route | Links | | | |
|---|---|---|---|---|
| | 0 | 1 | 2 | 3 |
| $p_0$ | 0 | 1 | — | — |
| $p_1$ | — | 0 | 2 | — |
| $p_2$ | 1 | — | 1 | 1 |
| $p_3$ | — | — | 3 | 3 |
| $p_4$ | 2 | 3 | — | 2 |
| $p_5$ | — | 2 | 0 | — |

Figure 5:
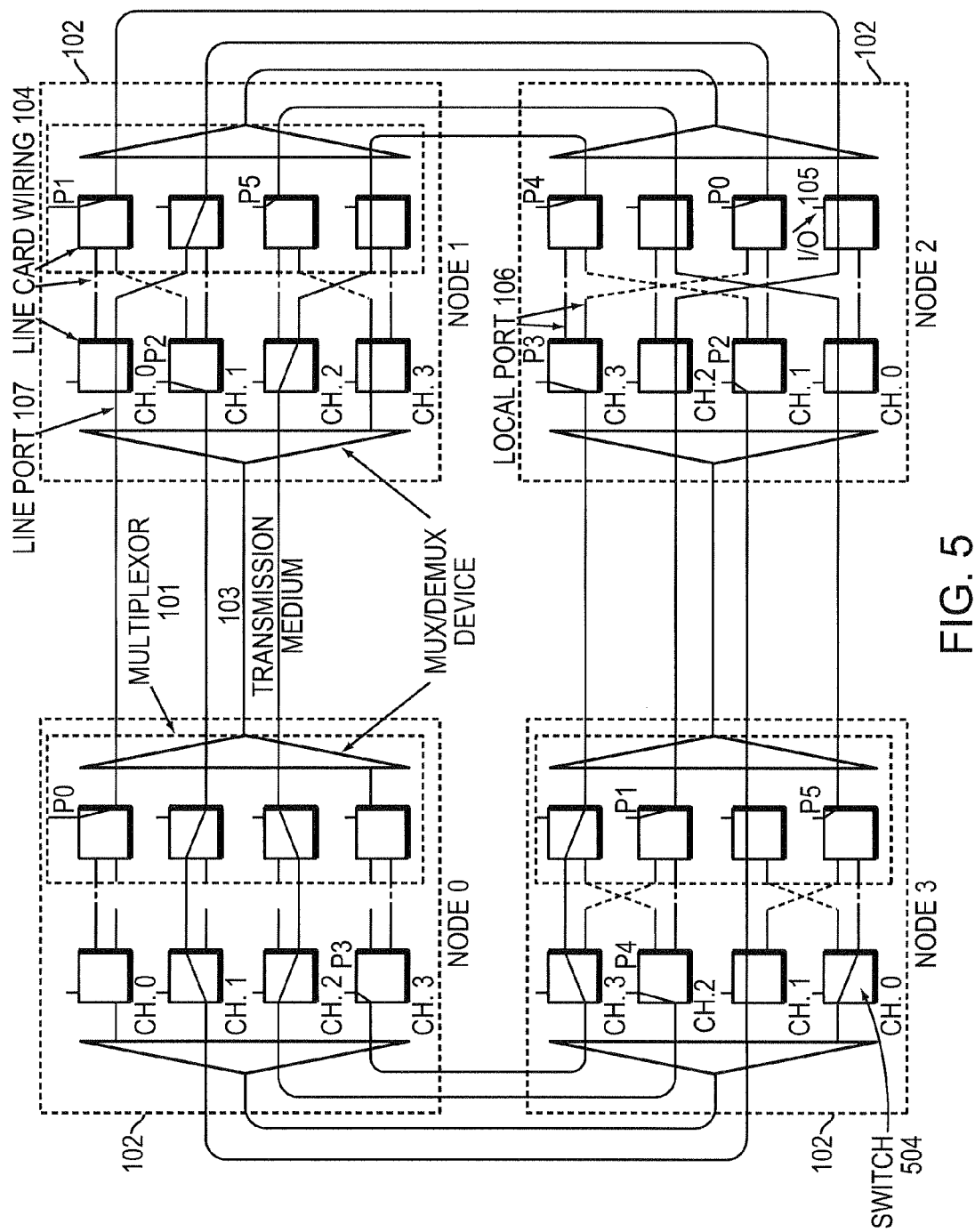
FIG. 5 shows the setting of the switches and the channel assignment for the request of FIG. 2 in a ring network with channel degree 2 for the configuration of FIG. 4.

The switching arrangement in the line cards to do this is shown in FIG. 5.

Configuration for Channel Degree Δ+1, where Δ>1

Consider a ring network with N≧$\log_\Delta$ W nodes. There is a configuration that has channel degree at most Δ+1 at each node with the following property. All requests that have load at most W are feasible.

Consider the following network configuration. For each link i=0, 1, . . . , N−1, its channel j∈{0, 1, . . . , W−1} is attached to the following channels on link (i+1) mod N: channel (j+1) mod W and channels $\{(j-k\cdot\Delta^i) \bmod W: k=0, 1, \ldots, \Delta-1\}$. Note that in this configuration, each node has channel degree at most Δ+1.

Figure 6:
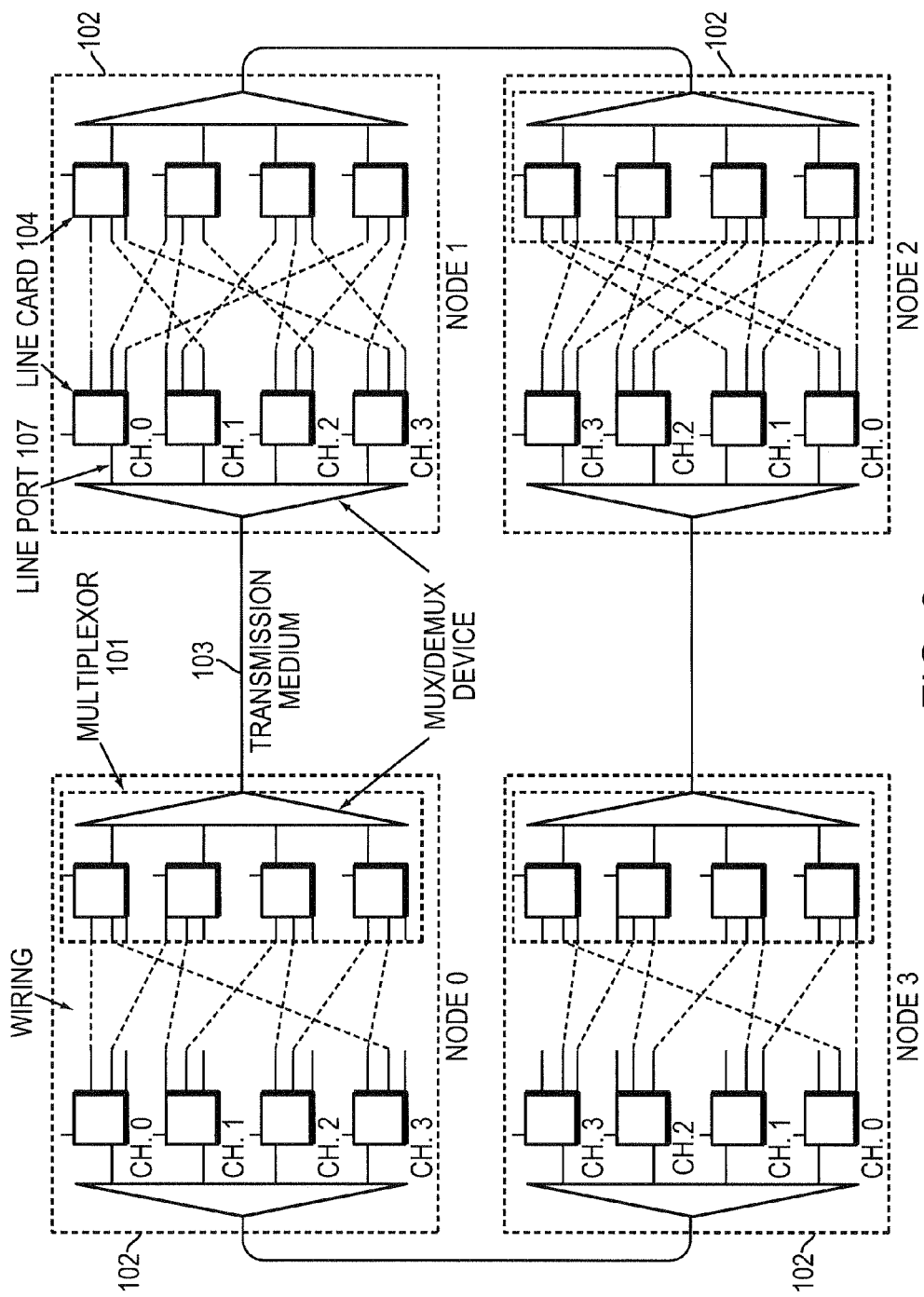
FIG. 6 shows a configuration of multiplexors in a ring network for the case of channel degree 3.

As an example consider the case of a 4-node ring network with W=4 channels per link, and Δ=2. Then for each link i∈{0, 1, 2, 3}, its channel j∈{0, 1, 2, 3} is attached to channels (j+1) mod 4, j, and (j−$2^i$) mod 4 on link (i+1) mod 4. For example, channel 1 on link 0 is attached to channels 2, 1, and 0 on link 1. As another example, note that channel 2 on link 3 is attached to channels 3 and 2 on link 0. The wiring arrangement is shown in FIG. 6.

Now consider an arbitrary request $\{p_1, \ldots, p_m\}$ with load at most W. We will now describe how to find a channel assignment for it. We can find a cut-and-color partition $(P_0, \ldots, P_{w-1})$ and a permutation π(•) for the partition as before. We will use the following definition. We call two numbers i and j in {0, 1, . . . , W} to be π-related if there is a value k and a sequence $(\tau_0, \tau_1, \ldots, \tau_k)$ of numbers from {0, . . . , W−1} such that $\tau_0$=i, $\tau_k$=j, and for i=0, 1, . . . , k−1, π($\tau_i$)=$\tau_{i+1}$. For example, suppose W=8 and $(\pi(0), \pi(1), \pi(2), \pi(3), \pi(4), \pi(5), \pi(6), \pi(7)) = (1, 3, 7, 5, 4, 0, 2, 6)$.

Note that $\pi(0)=1$, $\pi(1)=3$, $\pi(3)=5$, and $\pi(5)=0$. Thus, the numbers $\{0, 1, 3, 5\}$ are $\pi$-related. Similarly, the numbers within the following subsets are $\pi$-related: $\{2, 7, 6\}$ and $\{4\}$.

Partition the set $\{0, \ldots, W-1\}$ into nonempty subsets $\{C_0, \ldots, C_{M-1}\}$, where M is the number of subsets, such that numbers within a subset are $\pi$-related, while numbers from different subsets are not. Continuing with our example, the subsets could be $C_0=\{0, 1, 3, 5\}$, $C_1=\{2, 7, 6\}$, and $C_2=\{4\}$. For each $i=0, \ldots, M-1$, let $s_i$ denote the size of $C_i$. Then for the example, $s_0=4$, $s_1=3$, and $s_2=1$.

Define any subset of $\{0, \ldots, W-1\}$ as a contiguous subset if it can be written as $\{(i+j) \bmod W : j=0, \ldots, k\}$ for some i and k in $\{0, \ldots, W-1\}$ Partition $\{0, \ldots, W-1\}$ into W contiguous subsets $(T_0, \ldots, T_{M-1})$ such that $T_i$ has size $s_i$. This can be done by finding a collection of numbers $\{t_0, \ldots, t_{M-1}\}$ from $\{0, \ldots, W-1\}$ such that for $i=0, \ldots, M-1$, $t_{(i+1) \bmod M} = (t_i + s_i) \bmod W$.

Then for $i=0, \ldots, M-1$, $T_i = \{(t_i+j) \bmod W : j=0, \ldots, s_i-1\}$.

To continue with our example, we could have $t_0=0$, $t_1=4$, $t_2=7$, $T_0=\{0, 1, 2, 3\}$, $T_1=\{4, 5, 6\}$, and $T_2=\{7\}$.

For $i=0, \ldots, M-1$, find a function $q_i(\bullet)$ that is defined on the set $\{0, \ldots, s_i-1\}$ such that 1. there is an element $j \in C_i$ such that $q_i(j)=0$ and
2. for each element $j \in C_i$, $q_i(\pi(j)) = (q_i(j)+1) \bmod s_i$.

To continue with our example, let us determine what $q_0(\bullet)$ should be. Recall that $C_0=\{0, 1, 3, 5\}$, and that $\pi(0)=1$, $\pi(1)=3$, $\pi(3)=5$, and $\pi(5)=0$. Then we could have $(q_0(0), q_0(1), q_0(3), q_0(5)) = (0, 1, 2, 3)$. Similarly, we could have $(q_1(2), q_1(7), q_1(6)) = (0, 1, 2)$, and $(q_2(4)) = (0)$.

For $k=0, \ldots, M-1$, let $(d_{N-1}(k), d_{N-2}(k), \ldots, d_0(k))$ denote the base $\Delta$, N digit representation of the value $s_k-1$. Now, for $i=0, \ldots, N-1$, let $$D_i(k) = \begin{cases} 0, & \text{if } i=0 \\ \sum_{n=0}^{i-1} d_n(k) \cdot \Delta^n, & \text{if } i>0 \end{cases}$$

For example, if $N=4$, $s_k-1=15$, and $\Delta=2$ then $(d_3(k), d_2(k), d_1(k), d_0(k))$ = the binary number $(1, 1, 1, 1)$, and $(D_3(k), D_2(k), D_1(k), D_0(k)) = (7, 3, 1, 0)$.

As another example, if $N=3$, $s_k-1=15$, and $\Delta=3$ then $(d_2(k), d_1(k), d_0(k))$ = the ternary number $(1, 2, 0)$, and $(D_2(k), D_1(k), D_0(k)) = (6, 0, 0)$.

For each subset $P_i$ ($i=0, \ldots, W-1$) from the cut-and-color partition, we assign it channels as follows. The channels assigned to $P_i$ will be denoted by $\sigma(i, 0)$, $\sigma(i, 1)$, ..., $\sigma(i,j)$, ..., $\sigma(i, N-1)$, where $\sigma(i,j)$ is the channel on link j. Let k be such that $P_i \in C_k$. For $j=0, \ldots, N-1$, let $\rho(i,j)$ be the following value $$\rho(i, j) = \begin{cases} s_k - 1 - D_j(k), & \text{if } q_k(i) = s_k - 1 \\ q_k(i), & \text{if } q_k(i) < s_k - 1 \text{ and } q_k(i) < s_k - 1 - D_j(k) \\ q_k(i) + 1, & \text{if } q_k(i) < s_k - 1 \text{ and } q_k(i) \geq s_k - 1 - D_j(k) \end{cases}$$

For $j=0, \ldots, N-1$, let $\sigma(i,j) = (t_k + \rho(i,j)) \bmod W$. For example, suppose $N=4$, $\Delta 2$, $W=32$, and $C_k=\{4, 5, \ldots, 11\}$. Here, note that $s_k=8$, $(d_3(k), d_2(k), d_1(k), d_0(k)) = (0, 1, 1, 1)$, and $(D_3(k), D_2(k), D_1(k), D_0(k)) = (7, 3, 1, 0)$.

Suppose that $(\pi(4), \pi(5), \ldots, \pi(11)) = (5, 6, \ldots, 11, 4)$ and $(q_k(4), q_k(5), \ldots, q_k(11)) = (0, 1, \ldots, 6, 7)$.

In addition, to simplify the example, suppose that $t_k=0$, so that $\sigma(i,j)=\rho(i,j)$ for all $i \in C_k$. Then we have the following channel assignment for the subsets in $C_k$:

|      | Sets |       |       |       |       |       |          |          |
|------|------|-------|-------|-------|-------|-------|----------|----------|
| Link | $P_4$ | $P_5$ | $P_6$ | $P_7$ | $P_8$ | $P_9$ | $P_{10}$ | $P_{11}$ |
| 0    | 0    | 1     | 2     | 3     | 4     | 5     | 6        | 7        |
| 1    | 0    | 1     | 2     | 3     | 4     | 5     | 7        | 6        |
| 2    | 0    | 1     | 2     | 3     | 5     | 6     | 7        | 4        |
| 3    | 1    | 2     | 3     | 4     | 5     | 6     | 7        | 0        |

The values of $\sigma(l,j)$, where $l \in C_k$, can be read from the table. For example, the channels assigned to $P_8$ are channel $\sigma(8, 0)=4$ in link 0, channel $\sigma(8, 1)=4$ in link 1, channel $\sigma(8, 2)=5$ in link 2, and channel $\sigma(8, 3)=5$ in link 3. To see what the table looks like when $t_k$ is not zero, suppose the $t_k$ were changed to 10. Then the following channel assignment for the subsets in $C_k$ would result.

|      | Sets |       |       |       |       |       |          |          |
|------|------|-------|-------|-------|-------|-------|----------|----------|
| Link | $P_4$ | $P_5$ | $P_6$ | $P_7$ | $P_8$ | $P_9$ | $P_{10}$ | $P_{11}$ |
| 0    | 10   | 11    | 12    | 13    | 14    | 15    | 16       | 17       |
| 1    | 10   | 11    | 12    | 13    | 14    | 15    | 17       | 16       |
| 2    | 10   | 11    | 12    | 13    | 15    | 16    | 17       | 14       |
| 3    | 11   | 12    | 13    | 14    | 15    | 16    | 17       | 10       |

Channels can be assigned to each route $p_k$ of the request as follows. Suppose $p_k$ is an uncut route. Let i be such that $p_k \in P_i$. For each link j that is traversed by $p_k$, the channel $\sigma(i,j)$ of the link is assigned to $p_k$. Suppose $p_k$ is a cut route. Let $a_k$ and $b_k$ be its residual paths. Let $i_a$ and $i_b$ be such that $a_k \in P_{i_a}$ and $b_k \in P_{i_b}$. For each link j that is traversed by $a_k$, the channel $\sigma(i_a,j)$ of the link is assigned to $p_k$. For each link j that is traversed by $b_k$, the channel $\sigma(i_b,j)$ of the link is assigned to $p_k$.

Example: Consider a 4-node ring network that has $W=4$ channels per link, and where it is configured according to $\Delta=2$. Hence, the wiring arrangement in the line cards is shown in FIG. 6.

Suppose the requests are shown in FIG. 2. The cut-and-color partition and the permutation $\pi(\bullet)$ for the partition is the same as before. Thus, $(\pi(0), \pi(1), \pi(2), \pi(3)) = (1, 2, 3, 0)$. Then we have $C_0=\{0, 1, 2, 3\}$, $s_0=4$, $(d_3(0), d_2(0), d_1(0), d_0(0)) = (0, 0, 1, 1)$, $(D_3(0), D_2(0), D_1(0), D_0(0)) = (3, 3, 1, 0)$, and $(q_0(0), q_0(1), q_0(2), q_0(3)) = (0, 1, 2, 3)$ Thus the sets $P_0$, $P_1$, $P_2$, $P_3$ are assigned channels on the links as follows:

| Set | Links | | | |
|---|---|---|---|---|
| | 0 | 1 | 2 | 3 |
| $p_0$ | 0 | 0 | 1 | 1 |
| $p_1$ | 1 | 1 | 2 | 2 |
| $p_2$ | 2 | 3 | 3 | 3 |
| $p_3$ | 3 | 2 | 0 | 0 |

Based on this, the individual routes are assigned channels as given below:

| Route | Links | | | |
|---|---|---|---|---|
| | 0 | 1 | 2 | 3 |
| $p_0$ | 0 | 0 | — | — |
| $p_1$ | — | 1 | 2 | — |
| $p_2$ | 1 | — | 1 | 1 |
| $p_3$ | — | — | 3 | 3 |
| $p_4$ | 2 | 3 | — | 2 |
| $p_5$ | — | 2 | 0 | — |

Figure 7:
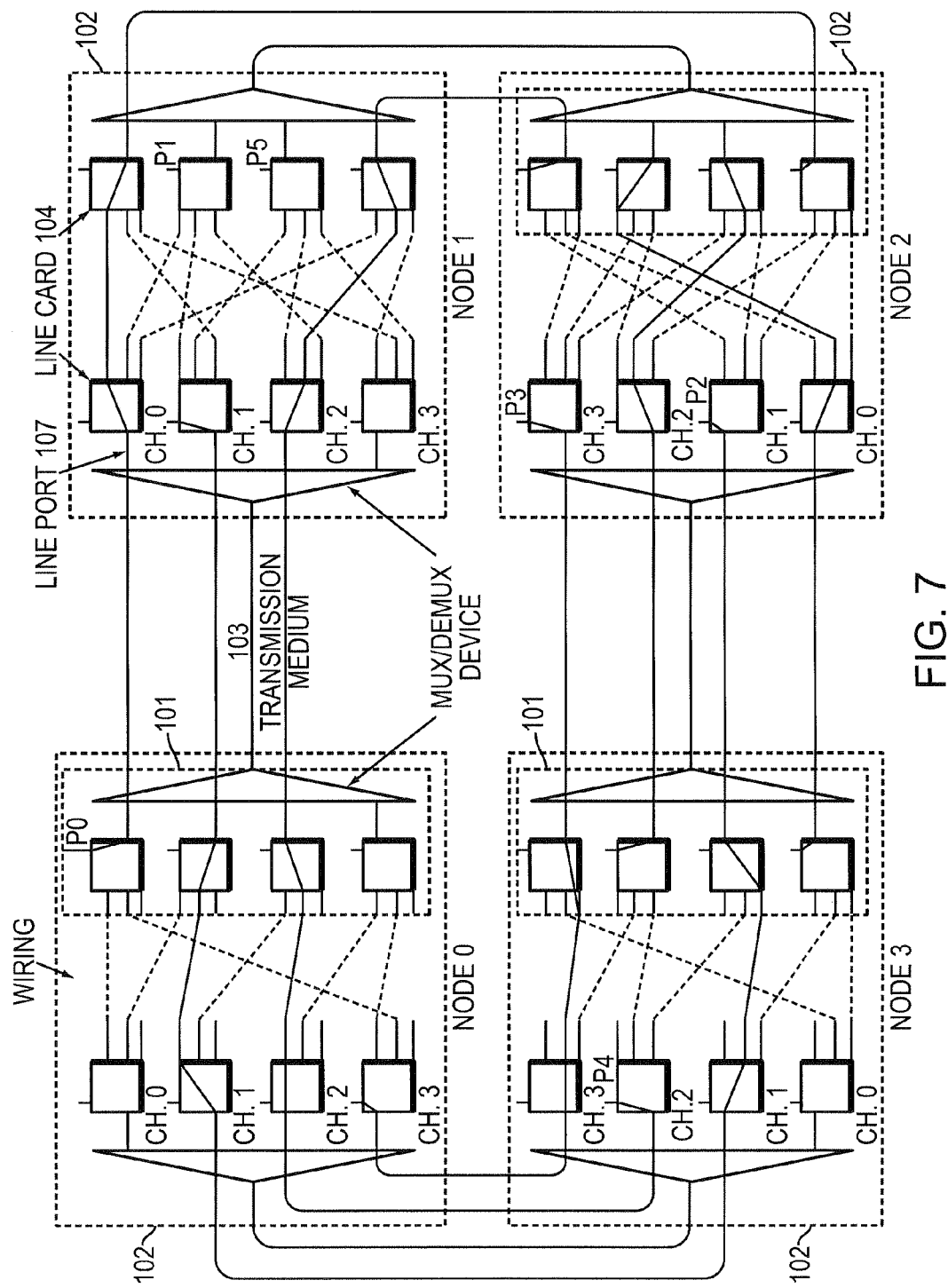
FIG. 7 shows the setting of the switches and the channel assignment for the request of FIG. 2 in a ring network with channel degree 3 for the configuration of FIG. 6.

The switch settings corresponding to this assignment are shown in FIG. 7.

Star Network

Figure 8:
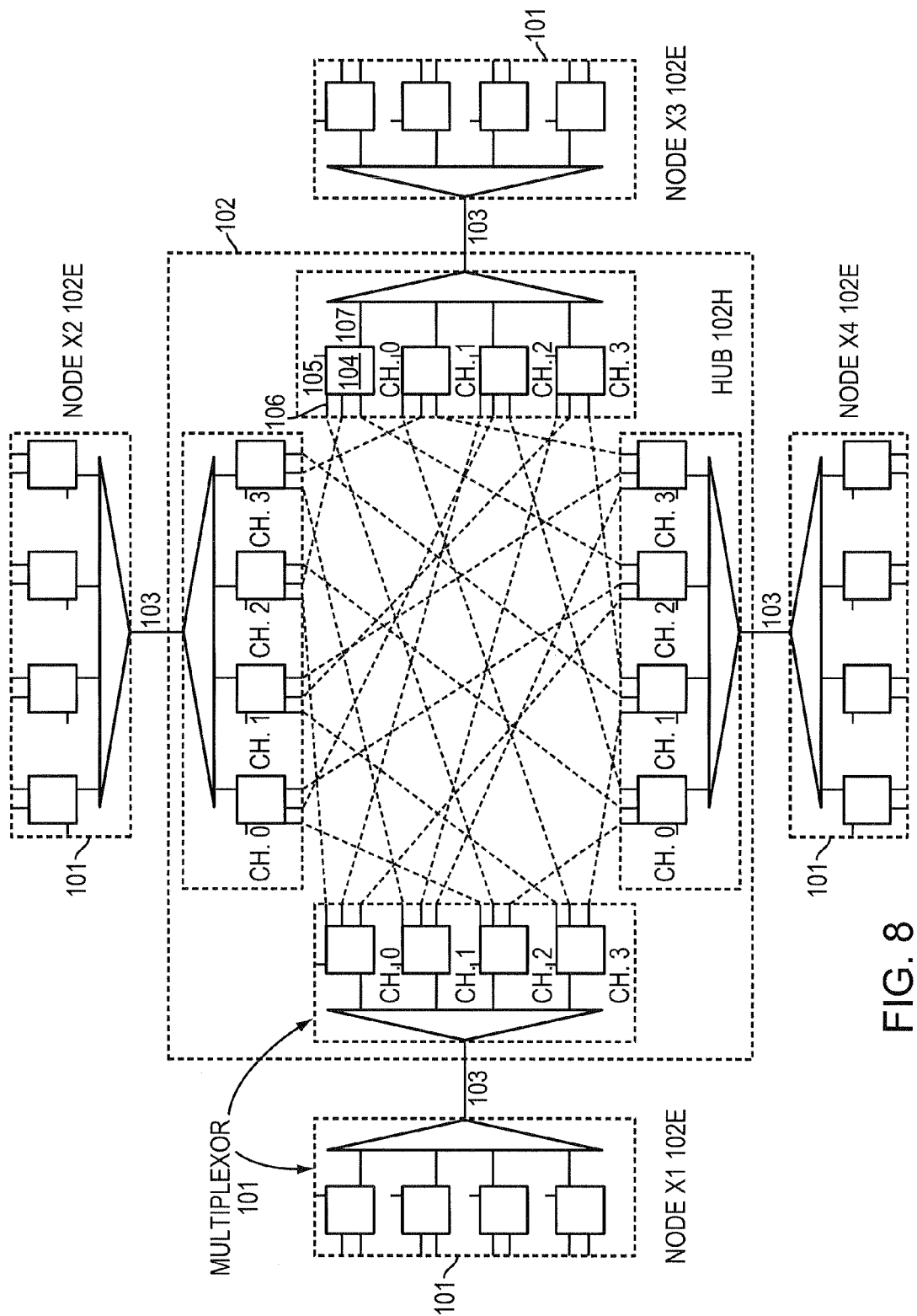
FIG. 8 shows a configuration of multiplexors in a star network with fixed channel conversion.

FIG. 8 shows the block diagram of multiplexors 101 connected in a star network configuration. The network consists of a hub node 102H and spoke nodes 102E. The spoke nodes are connected to the hub node by a transmission link or medium 103. Each spoke node 102E in the network consists of a multiplexor. The hub node consists of a multiplexor for each link (or each spoke node) in the network. The multiplexors in the hub node are wired together according to a specified pattern. The figure shows 4 channels on each link. For each channel there is a line card 104 within each multiplexor. A line card consists of an I/O port 105, multiple local ports 106 and a line port 107 and a switch (not shown in the figure) that allows any pairs of these ports to be connected together.

Our results use the following network configuration of channels when W, the number of channels per link, is even. Each link has its channel $i=0, 1, \ldots, W/2-1$ connected to channel $w(i)$ (through the hub node) on all the other links, where $w(i)=i+W/2$. We will denote the hub node by h, and the spoke nodes by $\chi_1, \ldots, \chi_{N-1}$. For $i=1, \ldots, N-1$, let $e_i$ denote the link between nodes h and $\chi_i$.

Once the network is configured, a channel assignment may be found for any request that has load at most W and each route of the request traverses at most two links. The following is the procedure to find a channel assignment. Let $\{p_1, \ldots, p_M\}$ denote the routes of the request. Let $\{p_1, \ldots, p_m\}$ denote the routes that traverse exactly two links. Hence, the routes $\{p_{m+1}, \ldots, p_M\}$ denote the ones that traverse exactly one link.

We will refer to a path as being incident to its end nodes. For example, a path that traverses a sequence of nodes ($\chi_i$, h, $\chi_j$) (hence, it traverses exactly two links), is considered to be incident to its end nodes $\chi_i$ and $\chi_j$ (here, h is an intermediate node). As another example, a path that traverses the sequence of nodes ($\chi_j$, h) (hence, it traverses exactly one link), is considered to be incident to its end nodes $\chi_j$ and h.

A path may be directed, which means that it is viewed as going from one of its end nodes to its other end node. For example, if a path traverses two links and has end nodes $\chi_i$ and $\chi_j$ then it may be directed from $\chi_i$ to h and then to $\chi_j$, or it may be directed from $\chi_j$ to h and then to $\chi_i$. If a path traverses one link and has end nodes $\chi_i$ and h then it may be directed from $\chi_i$ to h, or it may be directed from h to $\chi_i$. As part of the channel assignment procedure, the routes $\{p_1, \ldots, p_m\}$ will be directed so that at each spoke node there are at most W/2 incident routes of $\{p_1, \ldots, p_m\}$ that are directed into the node, and at most W/2 incident routes of $\{p_1, \ldots, p_m\}$ that are directed out of the node. The procedure to direct these routes is as follows.

If the number of routes of $\{p_1, \ldots, p_m\}$ that traverse each link is exactly W then let R=M. Otherwise, find additional paths $\{p_{M+1}, \ldots, p_R\}$ such the number of routes of $\{p_1, \ldots, p_R\}$ that traverse each link is exactly W. The additional paths $\{p_{M+1}, \ldots, p_R\}$ are referred to as dummy paths. Note that the dummy paths can be found as follows. For $i=1, \ldots, N-1$, let there be $W-n_i$ dummy paths, each traversing only link $e_i$, where $n_i$ is the number of routes (that are not dummy paths) traversing link $e_i$.

The paths of $\{p_1, \ldots, p_R\}$ are directed as follows. Consider each path of $\{p_1, \ldots, p_R\}$ as being initially undirected. Refer to a node that has at least one undirected incident path as a free node. As long as there is a free node, do the following:

1. Start from a free node, say $\chi_j$, and traverse an undirected incident path (from the set $\{p_1, \ldots, p_R\}$) to the other end node, and direct the path in the direction of the traversal.

2. From the other end node, traverse an undirected incident path (from the set $\{p_1, \ldots, p_R\}$) to the next end node, and direct the path in the direction of the traversal.

3. Keep traversing undirected paths (and directing the traversed paths) in this way until node $\chi_j$ is reached.

Now construct a bipartite graph G which has two sets of vertices: $\{u_1, \ldots, u_{N-1}\}$ and $\{v_1, \ldots, v_{N-1}\}$. It has edges $b_1, \ldots, b_m$, where $b_1$ is between $u_j$ and $v_k$ if path $p_i$ traverses links $e_j$ and $e_k$ in the star network and $p_i$ is directed so that it goes from node $\chi_j$ to h and then to $\chi_k$. Note that in G, each vertex has at most W/2 incident edges because each spoke node of the star network has at most W/2 incoming incident paths and at most W/2 outgoing incident paths. Next, assign numbers $\{0, \ldots, W/2-1\}$ to the edges of G such that distinct numbers are assigned to edges incident to a common node, and denote the number assigned to link $b_i$ (for $i=1, \ldots, m$) by $q(b_i)$. This can be accomplished using the scheduling algorithms used for Satellite Switched/Time Division Multiple Access (SS/TDMA) systems [13], incorporated herein by reference. Using the assignment of numbers, we can get a channel assignment for the routes $\{p_i, \ldots, p_m\}$ as follows. For $i=1, \ldots, m$, suppose $p_i$ traverses links $e_j$ and $e_k$ such that the direction of $p_i$ goes from $\chi_j$ to h and then to $\chi_k$. Then channel $q(b_i)$ on link $e_j$ is assigned to $p_i$, and the channel $w(q(b_i))$ on link $e_k$ is also assigned to $p_i$.

Note that up to this point, channels have been assigned to the routes $\{p_i, \ldots, p_m\}$ Now channels will be assigned to the routes $\{p_{m+1}, \ldots, p_M\}$ (i.e., the routes that traverse exactly one link). This can be done by selecting each route and assigning it a channel on the link that it traverses that has yet to be assigned to a route.

Example: Consider the five node star network of FIG. 8, redrawn in FIG. 9(A). The network has a hub node h, and four spoke nodes $\{\chi_1, \chi_2, \chi_3, \chi_4\}$ Note that for $i=1, 2, 3, 4$, spoke node $\chi i$ and hub node h have link $e_i$ between them. Note that each link has W=4 channels numbered 0, 1, 2, 3. These channel numbers are partitioned into two groups: $\{0, 1\}$ and $\{2, 3\}$. Note that $w(0)=2$ and $w(1)=3$. The hub node is configured so that for $i=0, 1$, a channel i at each link is connected to channel $w(i)$ at all the other links.

Figure 9:
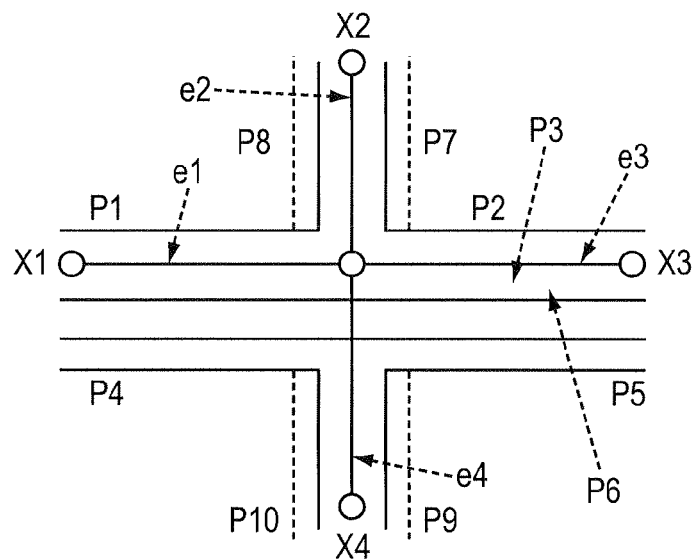
FIG. 9 (A) shows a simplified diagram of a star network with 4 end nodes and a sample request of routes. (B) shows how to direct the routes as described in the embodiment of the invention. (C) shows the construction of a bipartite graph and channel assignments for this request.
Figure 9:
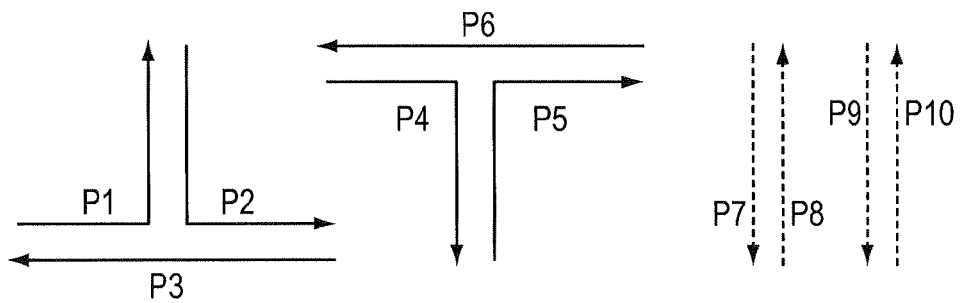
Figure 9:
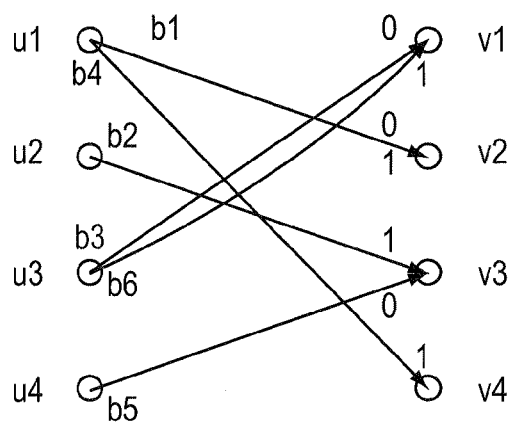

Now suppose there is a request $\{p_1, p_2, \ldots, p_6\}$ of six routes as shown in FIG. 9(A). These routes are as follows:

$p_1=\chi_1\text{-}h\text{-}\chi_2$
$p_2=\chi_2\text{-}h\text{-}\chi$ $p_3 = \chi_3 \text{-} h \text{-} \chi_1$
$p_4 = \chi_1 \text{-} h \text{-} \chi_4$
$p_5 = \chi_3 \text{-} h \text{-} \chi_4$
and
$p_6 = \chi_3 \text{-} h \text{-} \chi_1$.

Note that there are W=4 routes of the request traversing links $e_1$ and $e_3$, but there are only two routes of the request traversing links $e_2$ and $e_4$. Dummy paths $p_7$, $p_8$, $p_9$, and $p_{10}$ are found for the links $e_2$ and $e_4$ as shown in FIG. 9(A). Note that the paths $p_7$ and $p_8$ only traverse link $e_2$, and paths $p_9$ and $p_{10}$ only traverse link $e_4$. Now each link has exactly W=4 paths traversing it.

Paths $p_1, \ldots, p_{10}$ are initially considered undirected. Then they are directed as follows. First a node is chosen that has an undirected path incident to it (i.e., a free node is chosen). Node $\chi_1$ is such a node since it has undirected paths $p_1, p_3, p_4, p_6$ incident to it. One of the undirected incident paths is chosen to be traversed, say path $p_1$. After traversing it to node $\chi_2$, it is directed from end node $\chi_1$ to end node $\chi_2$. From node $\chi_2$, an undirected incident path is chosen to be traverse. Such paths are $p_2, p_7, p_8$. Suppose path $p_2$ is chosen. After traversing it to node $\chi_3$, it is directed from end node $\chi_2$ to end node $\chi_3$. From node $\chi_3$, an undirected incident path is chosen to be traversed. Such paths are $p_3, p_5, p_6$. Suppose path $p_3$ is chosen. After traversing it to node $\chi_1$, it is directed from end node $\chi_3$ to end node $\chi_1$. Note that the paths $p_1$, $p_2, p_3$ are directed is shown in FIG. 9(B). Since we returned to node $\chi_1$, we start the procedure of directing paths all over again. FIG. 9(B) shows the direction of paths $p_4, p_5, p_6$ which results by starting from node $\chi_4$ and traversing paths $p_5$, $p_6$, and then $p_4$. FIG. 9(B) also shows the direction of paths $p_7$, $p_8, p_9, p_{10}$ which results by starting from node $\chi_2$ and traversing paths $p_7, p_9, p_{10}$, and then $p_8$. Note that we have the following directions for the paths:

$p_1 = \chi_1 \rightarrow h \rightarrow \chi_2$
$p_2 = \chi_2 \rightarrow h \rightarrow \chi_3$
$p_3 = \chi_3 \rightarrow h \rightarrow \chi_1$
$p_4 = \chi_1 \rightarrow h \rightarrow \chi_4$
$p_5 = \chi_4 \rightarrow h \rightarrow \chi_3$
$p_6 = \chi_3 \rightarrow h \rightarrow \chi_1$
$p_7 = \chi_2 \rightarrow h$
$p_8 = h \rightarrow \chi_2$
$p_9 = h \rightarrow \chi_4$
and
$p_{10} = \chi_4 \rightarrow h$.

We now construct a bipartite graph G, as shown in FIG. 9(C), with two sets of vertices $\{u_1, u_2, u_3, u_4\}$ and $\{v_1, v_2, v_3, v_4\}$. There are six edges between the nodes denoted by $\{b_1, b_2, b_6\}$. For i=1, ..., 6, the edge $b_i$ corresponds to the route $p_i$ in the request. If $p_i$ has end nodes $\chi_j$ and $\chi_k$ and is directed from $\chi_j$ to $\chi_k$ then edge $b_i$ is between vertices $u_j$ and $v_k$. Thus, the edges of G are $b_1 = u_1 \text{-} v_2$
$b_2 = u_2 \text{-} v_3$
$b_3 = u_3 \text{-} v_1$
$b_4 = u_1 \text{-} v_4$
$b_5 = u_4 \text{-} v_3$
and
$b_6 = u_3 \text{-} v_1$.

Numbers from the set $\{0, 1\}$ (i.e., $\{0, \ldots, W/2-1\}$) are assigned to the edges of G so that at each vertex of G, its incident edges have distinct numbers. The number assigned to edge $b_i$ will be denoted by $q(b_i)$. A number assignment is shown in FIG. 9(C). Here, $q(b_1)=0$, $q(b_2)=1$, $q(b_3)=0$, $q(b_4)=1$, $q(b_5)=0$, and $q(b_6)=1$. Note that the SS/TDMA scheduling algorithm can be used to determine $q(b_i)$ for each edge $b_i$ of G.

The channel assignment to the routes are as follows. Note that $p_1$ corresponds to $b_1$, which has end vertices $u_1$ and $v_2$. Note that $u_1$ corresponds to link $e_1$, and $v_2$ corresponds to link $e_2$. The channels assigned to $p_1$ are channel $q(b_1)=0$ on link $e_1$ and channel $w(q(b_1))=2$ on link $e_2$. The channel assignment for all the routes of the request are given below:

$p_1$: channel 0 on link $e_1$, and channel 2 on link $e_2$,
$p_1$: channel 1 on link $e_2$, and channel 3 on link $e_3$,
$p_3$: channel 0 on link $e_3$, and channel 2 on link $e_1$,
$p_4$: channel 1 on link $e_1$, and channel 3 on link $e_4$,
$p_5$: channel 0 on link $e_4$, and channel 2 on link $e_3$,
and
$p_6$: channel 1 on link $e_3$, and channel 3 on link $e_1$.

Figure 10:
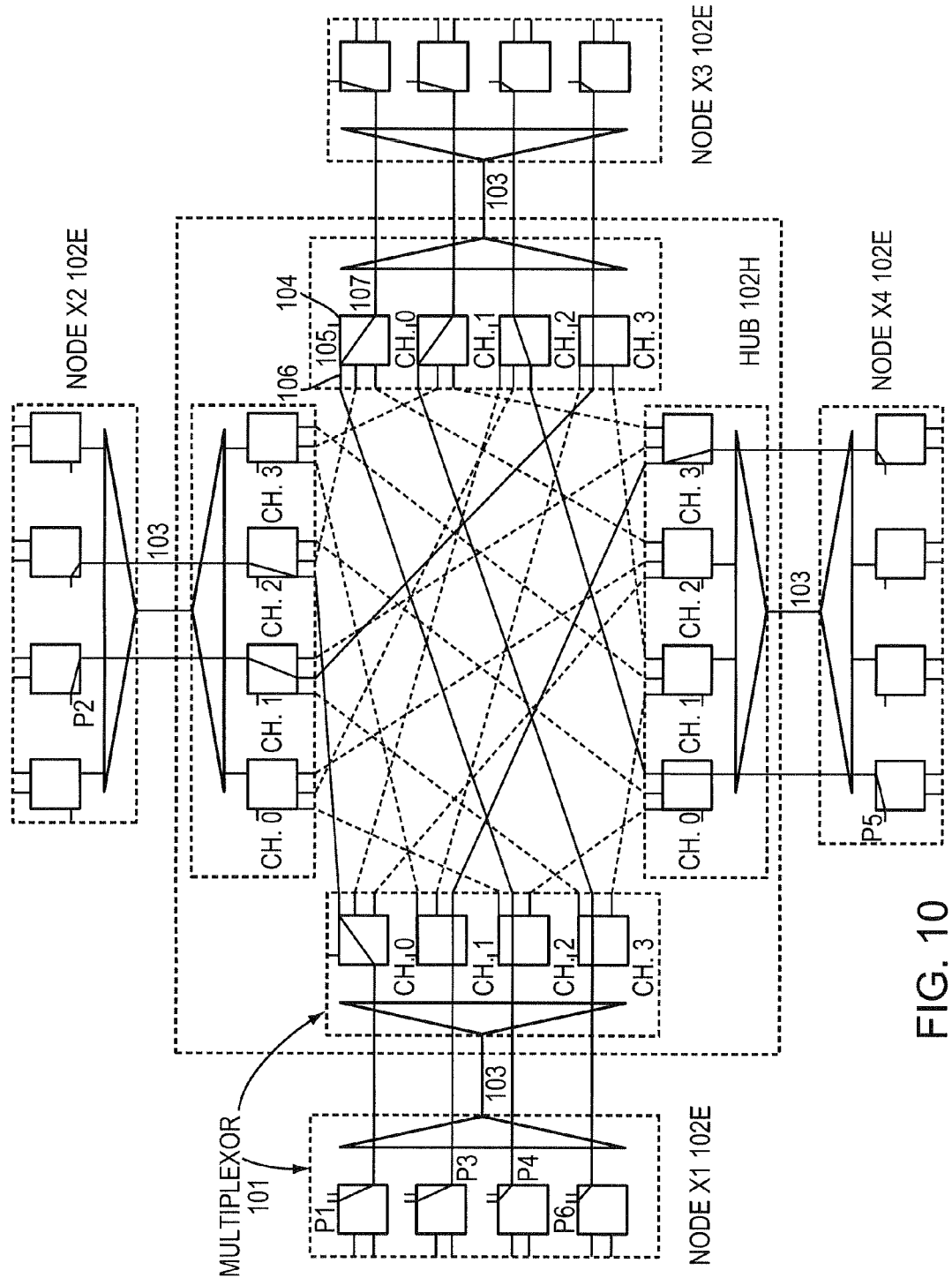
FIG. 10 shows the setting of the switches and the channel assignment for the request of FIG. 9 for the configuration of FIG. 8.

The corresponding setting of the switches and channel assignment in the network are shown in FIG. 10 for routes $p_1$, $p_2$ and $p_3$ as an illustration.

Arbitrary Topology Networks

Consider an arbitrary topology network such that each link has W channels, where W is even. Then the following method gives a fixed conversion configuration of the network and a channel assignment that assigns channels for any set of connections with routes that have congestion at most W and have at most two hops.

The channel assignment is done by converting the given network into a star network as follows. Each link i' in the star network corresponds to a link i in the original network. A connection that is to be routed on links i and j in the original network is now to be routed on links i' and j' in the star network. The congestion in the star network is at most W and hence these connections can be routed using the results of the star configuration.

While this invention has been particularly shown and described with references to example embodiments thereof, it will be understood by those skilled in the art that various changes in form and details may be made therein without departing from the scope of the invention encompassed by the appended claims.

What is claimed is:

1. A primary node for a ring communications network, the primary node comprising:
    first and second multiplexors configured to connect to first and second multichannel transmission links, respectively, to adjacent nodes in the ring communications network, each multiplexor including:
        line cards coupled between the first and second multiplexors, the line cards being configured to connect any channel on the first multichannel transmission link to any channel on the second multichannel transmission link; and
        a mux/demux unit coupling the line cards with the respective multichannel transmission link.

2. The primary node of claim 1, wherein the primary node is further configured to connect through the first multichannel transmission link to another node on the ring network that is configured for no channel conversion, no channel conversion being an ability to connect each of the channels on the first multichannel transmission link to corresponding channels on a third multichannel transmission link.

3. The primary node of claim 1, wherein the first and second multiplexors are configured to demultiplex channels input to the primary node and multiplex channels output from the primary node.

4. The primary node of claim 1, wherein the line cards include switches.

5. The primary node of claim 1, wherein the multichannel transmission links are optical fiber links.

6. A node for a ring communications network, the node comprising:
- first and second multiplexors configured to connect to first and second multichannel transmission links, respectively, to adjacent nodes in the ring communications network, each multiplexor including:
  - line cards coupled between the first and second multiplexors, the line cards being configured to connect a first channel on the first multichannel transmission link to the same first channel on the second multichannel transmission link; and
  - a mux/demux unit coupling the line cards with the respective multichannel transmission link.

7. The node of claim 5, wherein the first and second multiplexors are configured to demultiplex channels input to the node and multiplex channels output from the node.

8. The node of claim 5, wherein the first and second multichannel transmission links are optical fiber links.

9. The node of claim 5, wherein the line cards include switches.

10. A hub node for a star communications network, the hub node comprising:
- multiplexors configured to be coupled to multichannel transmission links, each link including an even number of channels divided into first and second groups, and each multiplexor including:
  - line cards operably coupled to the multiplexors, each line card being configured to couple each channel of the first group of a first link to one channel of the second group of each of the other links; and
  - a mux/demux unit coupling the line cards with the respective multichannel transmission link.

11. The hub node of claim 10, wherein the first group of channels includes channels $i=0, 1, \ldots, W/2-1$ and the one channel of the second group of channels is channel $i+W/2$, where W is an even number.

12. The hub node of claim 11, wherein no more than W channels are assigned to the transmission of data along any of the links.

13. The hub node of claim 10, wherein routes are assigned to the channels which traverse at most two links in the star communications network.

14. The hub node of claim 10, wherein the multiplexors are configured to demultiplex channels input to the node and multiplex channels output from the node.

15. The hub node of claim 10, wherein the multichannel transmission links are optical fiber links.

16. The hub node of claim 10, wherein the line cards include switches.

17. A hub node for a star communications network, the hub node comprising:
- multiplexors configured to connect to multichannel transmission links, each link being arranged to carry no more than a certain number of channels into and out of the hub node, and each multiplexor including:
  - line cards operably coupled to the multiplexors, each line card being configured to connect physically each channel of a first link to no more than two predetermined channels of a second link through the hub node; and
  - a mux/demux unit coupling the line cards with the respective multichannel transmission link.

18. The hub node of claim 17, wherein the multiplexors are configured to demultiplex channels input to the node and multiplex channels output from the node.

19. The hub node of claim 17, wherein the multichannel transmission links are optical fiber links.

20. The hub node of claim 17, wherein the line cards include switches.

* * * * *